(12) United States Patent
D'Agostino

(10) Patent No.: US 12,437,157 B2
(45) Date of Patent: Oct. 7, 2025

(54) SYSTEM AND METHOD FOR CONTENT MANAGEMENT FOR A CONVERSATIONAL ARTIFICIAL INTELLIGENCE TOOL

(71) Applicant: The Toronto-Dominon Bank, Toronto (CA)

(72) Inventor: Dino Paul D'Agostino, Richmond Hill (CA)

(73) Assignee: The Toronto-Dominion Bank, Toronto (CA)

(*) Notice: Subject to any disclaimer, the term of this patent is extended or adjusted under 35 U.S.C. 154(b) by 70 days.

(21) Appl. No.: 18/350,271

(22) Filed: Jul. 11, 2023

(65) Prior Publication Data
US 2025/0021744 A1 Jan. 16, 2025

(51) Int. Cl.
G06F 40/35 (2020.01)
G06F 16/3329 (2025.01)
G06F 40/166 (2020.01)
G06F 40/30 (2020.01)
H04L 51/02 (2022.01)

(52) U.S. Cl.
CPC .......... *G06F 40/35* (2020.01); *G06F 16/3329* (2019.01); *G06F 40/166* (2020.01); *G06F 40/30* (2020.01); *H04L 51/02* (2013.01)

(58) Field of Classification Search
CPC .... G06F 40/166; G06F 16/3329; G06F 40/35; G06F 16/90332; G06F 16/243; G06F 40/30; H04L 51/02
See application file for complete search history.

(56) References Cited

U.S. PATENT DOCUMENTS

| | | |
|---|---|---|
| 8,638,908 B2 | 1/2014 | Leeds et al. |
| 8,935,006 B2 | 1/2015 | Vu et al. |
| 10,037,768 B1 | 7/2018 | Akkiraju et al. |
| 10,335,954 B2 | 7/2019 | Monceaux et al. |
| 11,062,220 B2 | 7/2021 | Sengupta et al. |
| 11,064,074 B2 | 7/2021 | Erhart et al. |
| 11,120,799 B1* | 9/2021 | Sundararaman ...... G06F 40/253 |
| 11,218,387 B2 | 1/2022 | Clarke et al. |
| 11,238,377 B2 | 2/2022 | Polleri et al. |
| 11,431,660 B1 | 8/2022 | Leeds et al. |

(Continued)

*Primary Examiner* — Nicholas Ulrich
(74) *Attorney, Agent, or Firm* — Borden Ladner Gervais LLP

(57) ABSTRACT

Computing platforms, methods, and storage media for content management for a conversational artificial intelligence tool are disclosed. Exemplary implementations may: intercept, by an apparatus and from a data communication channel, a conversational AI message associated with the conversational AI tool; determine, by a plugin manager at the apparatus and based on stored policies, one or more plugins to receive the intercepted conversational AI message; selectively forward, at the apparatus, the conversational AI message to the one or more plugins for processing; and output, by the plugin manager at the apparatus, a modified conversational AI message based on the processing at the one or more plugins. Exemplary implementations may be configured to assist with one or more of: automatically moderating content sent to and from conversational AI solutions, assisting with ensuring responsible content and AI interactions, flagging undesirable intentions, and automating model governance.

20 Claims, 5 Drawing Sheets

(56) References Cited

U.S. PATENT DOCUMENTS

| | | |
|---|---|---|
| 2019/0087707 A1 | 3/2019 | Cummins et al. |
| 2022/0374956 A1 | 11/2022 | Jungmeisteris et al. |
| 2024/0054292 A1* | 2/2024 | Chen .................... H04L 51/02 |
| 2024/0086434 A1* | 3/2024 | Hannon ............. G06F 16/3349 |
| 2024/0370769 A1* | 11/2024 | Sheth .................... G06N 20/00 |

* cited by examiner

SYSTEM AND METHOD FOR CONTENT MANAGEMENT FOR A CONVERSATIONAL ARTIFICIAL INTELLIGENCE TOOL

FIELD

The present disclosure relates to content management, including but not limited to computing platforms, methods, and storage media for content management for a conversational artificial intelligence tool.

BACKGROUND

Conversational artificial intelligence (AI) tools can provide beneficial features and functionality. There are, however, concerns that conversational AI solutions may be trained in a biased way that is not aligned with policies or practices of the organization using the tools.

For example, some AI solutions are based on a Generative Pre-training Transformer (GPT). Conversational AI technologies such as ChatGPT based on large language models (LLMs) may respond rudely or inappropriately over time to user inquiries. Such response may be based on having been provided with inappropriate content during initial training, or by users providing inappropriate content during ongoing operation. When the conversational AI is trained to interact in a way that may be considered to be racist, misogynistic or transphobic, this may lead to reputational damage for an organization employing the conversational AI tool. This may cause the organization to re-evaluate whether the tool is reliable enough to be used, and whether the outputs of the conversational AI tool can be consistently relied upon.

Improvements in approaches for content management for a conversational artificial intelligence tool are desirable.

BRIEF DESCRIPTION OF THE DRAWINGS

Embodiments of the present disclosure will now be described, by way of example only, with reference to the attached Figures.

DETAILED DESCRIPTION

Figure 1:
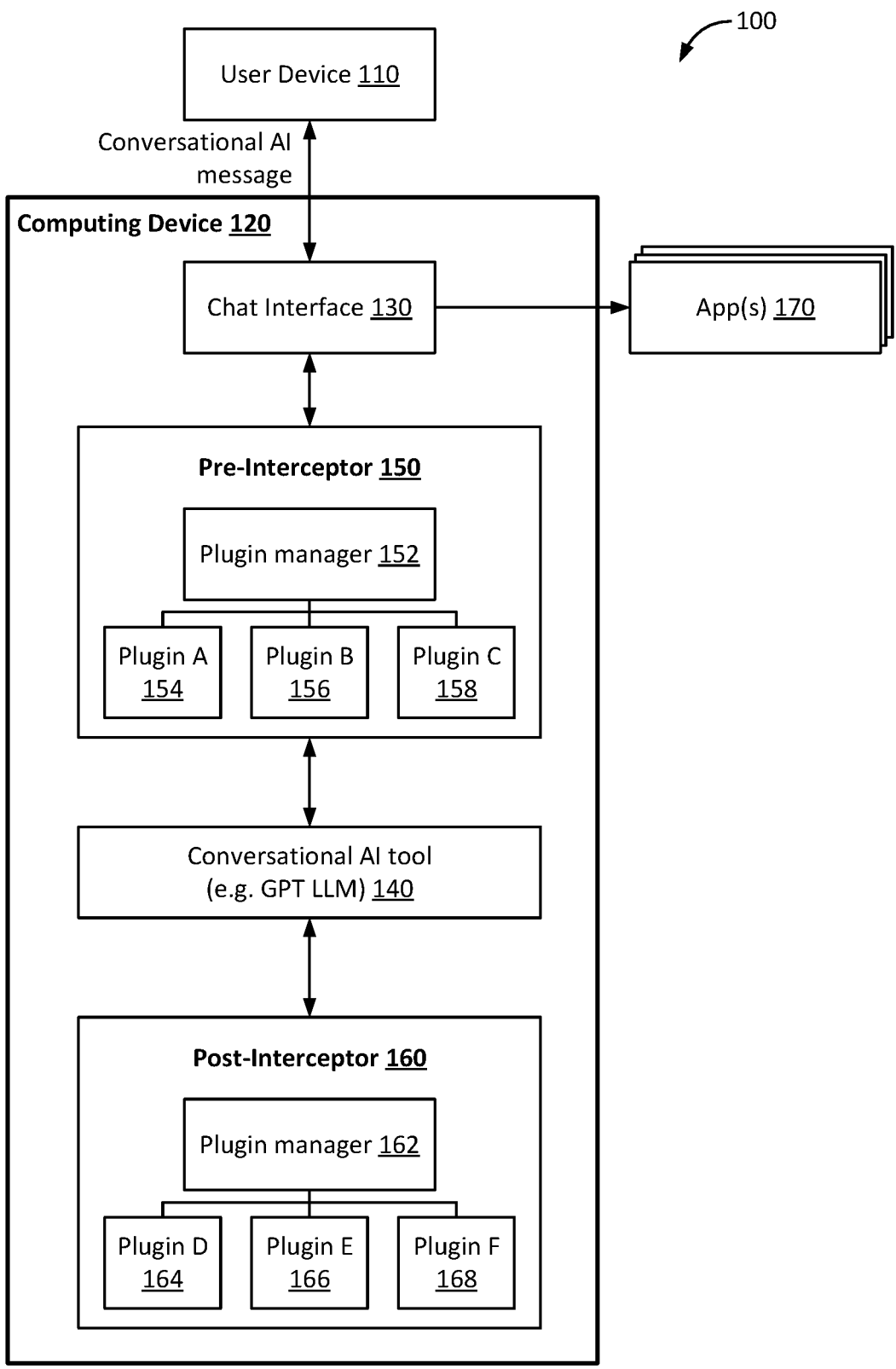
FIG. 1 illustrates a system configured for content management for a conversational artificial intelligence tool, in accordance with one or more embodiments.

Computing platforms, methods, and storage media for content management for a conversational artificial intelligence tool are disclosed. Exemplary implementations may: intercept, by an apparatus and from a data communication channel, a conversational AI message associated with the conversational AI tool; determine, by a plugin manager at the apparatus and based on stored policies, one or more plugins to receive the intercepted conversational AI message; selectively forward, at the apparatus, the conversational AI message to the one or more plugins for processing; and output, by the plugin manager at the apparatus, a modified conversational AI message based on the processing at the one or more plugins.

The present disclosure provides one or more embodiments of a system and method to automatically moderate content sent to and from conversational AI solutions such as ChatGPT, to ensure responsible content and flag undesirable intentions. According to one or more embodiments, bi-directional content moderation is provided to deliver responsible AI interactions and automate model governance.

In an example implementation, the conversational AI solution is implemented on a computing device associated with an organization, such as a financial institution. Embodiments of the present disclosure provide a tool that intercepts content sent to, and received from, an AI solution, for example generative AI such as ChatGPT or a similar tool, to ensure that content to/from the computing device implementing the AI tool aligns with the organization's policy for responsible AI and its governance framework. The system may independently validate message inputs and outputs from a collection of pre-trained models to ensure the models respond appropriately and are not trained to be racist or misogynistic, for example. In addition to preventing undesirable content/interaction, whether originated by a user or by an AI model, embodiments of the present disclosure may be used to flag inappropriate content that may be associated with potential fraud, or with privacy concerns based on user input to the tool.

One aspect of the present disclosure relates to an apparatus configured for content management for a conversational artificial intelligence tool. The apparatus may include a non-transient computer-readable storage medium having executable instructions embodied thereon. The apparatus may include one or more hardware processors configured to execute the instructions. The processor(s) may execute the instructions to intercept, by the apparatus and from a data communication channel, a conversational AI message associated with the conversational AI tool. The processor(s) may execute the instructions to determine, by a plugin manager at the apparatus and based on stored policies, one or more plugins to receive the intercepted conversational AI message. The one or more plugins may be selected from a plurality of plugins associated with the plugin manager. The processor(s) may execute the instructions to selectively forward, at the apparatus, the conversational AI message to the one or more plugins for processing. The processor(s) may execute the instructions to output, by the plugin manager at the apparatus, a modified conversational AI message based on the processing at the one or more plugins.

Another aspect of the present disclosure relates to a method for content management for a conversational artificial intelligence tool. The method may include intercepting, by an apparatus and from a data communication channel, a conversational AI message associated with the conversational AI tool. The method may include determining, by a plugin manager at the apparatus and based on stored policies, one or more plugins to receive the intercepted conversational AI message. The one or more plugins may be selected from a plurality of plugins associated with the plugin manager. The method may include selectively forwarding, at the apparatus, the conversational AI message to the one or more plugins for processing. The method may include outputting, by the plugin manager at the apparatus, a modified conversational AI message based on the processing at the one or more plugins.

Yet another aspect of the present disclosure relates to a non-transient computer-readable storage medium having instructions embodied thereon, the instructions being executable by one or more processors to perform a method for content management for a conversational artificial intelligence tool. The method may include intercepting, by an apparatus and from a data communication channel, a conversational AI message associated with the conversational AI tool. The method may include determining, by a plugin manager at the apparatus and based on stored policies, one or more plugins to receive the intercepted conversational AI message. The one or more plugins may be selected from a plurality of plugins associated with the plugin manager. The method may include selectively forwarding, at the apparatus, the conversational AI message to the one or more plugins for processing. The method may include outputting, by the plugin manager at the apparatus, a modified conversational AI message based on the processing at the one or more plugins.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a system 100 configured for content management for a conversational artificial intelligence tool, in accordance with one or more embodiments. A user device 110 may be in communication with a computing device 120, for example via a chat interface 130. In an embodiment, the chat interface 130 may be provided independent of the computing device 120, and in communication with the computing device 120 and the user device 110. The user device 110 may be in communication with the computing device 120 using voice or text, where the voice may be converted to text. The computing device 120 may be associated with an organization, and may be subject to the organization's policies and governance relating to AI implementation. A conversational AI tool 140, such as a GPT LLM, may be implemented at the computing device 120 associated with the organization. In an embodiment, the conversational AI tool 140 may be provided independent of the computing device 120, and in communication with the computing device 120. The computing device 120 may be configured to intercept, from a data communication channel, a conversational AI message associated with the conversational AI tool. The data communication channel may be any suitable wired, wireless or other communication channel configured to convey messages between the user device 110 and the computing device 120. A conversational AI message may be any message, such as a prompt or an output that is sent to or received from a conversational AI tool.

In the context of a conversational AI tool 140, such as a GPT LLM, a plugin represents a tool that is external to, and interacts with, the GPT LLM. In the case of ChatGPT, a plugin may also be referred to as an agent. A plugin may be a third-party tool designed to interact with the GPT LLM. A limitation of language models is that the only information they can learn is from their training data. Often, a plugin is used to obtain or provide up-to-date information to the GPT LLM, for example information that was only available after the date when the GPT LLM's training data was completed. A plugin may also be used to run computations or use third-party services.

In order to work properly with a GPT LLM, a plugin needs to be registered with the GPT LLM. According to known approaches, each plugin must be registered separately with the GPT LLM, or with the company running the GPT LLM, such as OpenAI in the case of ChatGPT. Typically, only one plugin may be invoked at a time.

Referring back to FIG. 1, the computing device 120 may be configured to determine, by a plugin manager at the computing device and based on stored policies, one or more plugins to receive the intercepted conversational AI message. In an embodiment, the plugin manager may be provided independent of the computing device 120, and in communication with the computing device 120. In an implementation, the intercepted conversational AI message is sent to the plugin manager. The one or more plugins may be selected from a plurality of plugins associated with the plugin manager.

A conversational AI tool such as a GPT LLM takes text as an input. Embodiments of the present disclosure, for example including a plugin manager, may be configured to intercept and possibly modify that text, for example based on more recent data than what the training data was based on. This addresses a technical problem according to which a GPT may "argue" based on stale data. With respect to governance controls, embodiments of the present disclosure enable an organization to ensure that the organization's governance controls are up-to-date. For example, in a situation in which a GPT LLM's governance controls may not be appropriate for an organization's governance framework, embodiments of the present disclosure solve this problem by enabling the organization to use a plugin manager to update or enhance a GPT LLM's standard governance framework to ensure compliance with the organization's desired AI governance model.

The plugin manager may have or be governed by policies to determine whether or not a given plugin needs to receive a given message, and whether the selected plugin(s) would modify the message or simply log/report the message. A database may be associated with each plugin, may comprise other LLMs, and may be configured to perform sentiment analysis or determine if a message contains confidential information or derogatory comments. The database may comprise previously created vector databases of customer transactions, internal organizational data, external organizational data and/or third party data.

For example, a plugin manager may comprise or implement an underlying rule engine and set of rules that determine what to do with messages, and which messages returned or modified by a downstream plugin can override other plugins. Some plugins may insert new messages (marketing ads or other information) and may modify the format or look and feel of the message. This may be implemented as a cooperating model amongst plugins to collectively deliver value to the end user. The various plugins may be or comprise fulfillment plugins to determine routing of a response back to other systems.

The messages sent to the plugins may be parallel or sequential in nature, and can be "fire and forget". The plugin manager may have a policy store associated with it to determine how the messages are sent and received. A message being returned from each plugin may or may not be modified by the plugin itself. The plugin manger may be configured to determine which plugins override.

According to one or more embodiments, a system may comprise one or more plugin managers. For example, a first plugin manager may determine to send a message on to a GPT LLM for further processing based on the underlying rule engine. Once the GPT LLM has performed its processing, it may pass the output on to a second plugin manager provided "after" the GPT LLM in a data flow.

In an embodiment, the plugin manager may be implemented at a pre-interceptor or at a post-interceptor, or both. In the example embodiment of FIG. 1, the computing device 120 comprises a pre-interceptor 150 configured to intercept an incoming conversational AI message between the user device 110 and the computing device 120 associated with an LLM 140 of the conversational AI tool. For example, the incoming conversational AI message may comprise an input or a prompt provided by a user associated with the user device 110, for processing by the LLM 140. The pre-interceptor 150 comprises a first plugin manager 152 configured to determine based on stored policies which of the pre-interceptor plugin A 154, plugin B 156 and/or plugin C 158 are to receive the intercepted conversational AI message.

In the example embodiment of FIG. 1, the computing device 120 comprises a post-interceptor 160 configured to intercept an outgoing conversational AI message between the computing device 120 associated with the LLM 140 and the user device 110. For example, the outgoing conversational AI message may comprise an output generated by the LLM 140 in response to an input or prompt from a user device 110 associated with a user. The post-interceptor 160 comprises a second plugin manager 162 configured to determine based on stored policies which of the post-interceptor plugin D 164, plugin E 166 and/or plugin E 168 are to receive the intercepted conversational AI message.

The computing device 120 may be configured to selectively forward the conversational AI message to the one or more plugins for processing. The computing device 120 may output, via a plugin manager, a modified conversational AI message based on the processing at the one or more plugins. In an example embodiment, the computing device 120 is further configured to intercept a plurality of conversational AI messages bi-directionally and in real-time.

In another example embodiment, the computing device 120 may be configured to block the conversational AI message when the conversational AI message is determined to be incompatible with the AI governance model. In a further example embodiment, the computing device 120 may be configured to process, at the one or more plugins, the conversational AI message, and to generate, at the one or more plugins, the modified conversational AI message.

In an embodiment, a plugin manager provided at the computing device 120 is configured to determine which plugin(s) to use. In a situation in which it is desirable to implement multiple plugins with a conversational AI tool, the plugin manager is configured to manage the implementations. The plugin manager may be implemented as a controller configured to make calls out to the plugins. According to one or more embodiments, a plugin manager may invoke multiple plugins either in parallel or sequentially. The plugin manager may be implemented as a listener, or as a manager/listener, for example listening to inputs and/or outputs to the GPT LLM.

Known approaches that implement a single plugin at a time, and which do not include a plugin manager, are not able to implement multiple plugins in parallel. The plugin manager enables operation of multiple plugins in parallel. The plugin manager may also be configured to allow multiple parallel or sequential invocations of multiple plugins.

According to known approaches, an organization must separately register each and every plugin with the GPT LLM (or with the company associated with the GPT LLM). Many organizations do not want to go through the registration process for plugins or agents. For example, the GPT LLM may pass a piece of text from a chat message received from a user device to a first plugin, introduce another plugin and let the operator of the GPT LLM know about it, for example with respect to separate registrations for each of the plugins.

According to one or more embodiments, a plugin manager is registered with the GPT LLM. The plugin manager has associated therewith a plurality of plugins. The plugin manager may define or operate with respect to a set of policies that dictate the order in which the plugins must be invoked, or in parallel, aggregate the responses. In this approach, it is no longer necessary to notify the operator of the GPT LLM, for example through separate plugin registrations. According to one or more embodiments, the plugin manager itself is registered with the GPT LLM, and the organization associated with the plugin manager can dynamically at run-time add more plugins as needed, and associate the plugins with the registered plugin manager, as long as the interface with the GPT LLM is via the registered plugin manager.

Embodiments of the present disclosure bypass the need to go in and make changes on the GPT LLM side to add additional agents or plugins. An organization may register the plugin manager as a centralized interface with the GPT LLM. The plugin manager may act as a central hub for indirect or moderated interaction of a plurality of plugins with the GPT LLM. A plugin manager may aggregate responses and actions. The plugin manager may be configured to modify the input request or response, or not to respond.

According to one or more embodiments, the plugin manager acts as a control framework to prevent a user from inputting text in a certain way, or may prevent the GPT LLM from responding to the user with hallucinations. Embodiments of the present disclosure enable an organization to dynamically and at run-time add additional controls based on the plugin manager. In an example implementation, a first plugin manager may be associated with a first role, such as an employee. In an example implementation, a second plugin manager may be associated with a second role, such as an investment manager, and may implement different policies and/or governance framework than the first plugin manager, in view of desired differences in implementation for the different types of users interacting with the GPT LLM.

The user device 110 may use the chat interface 130 to communicate with or invoke one or more external apps 170, or external systems associated with the external apps, with either voice or text commands.

One technical problem is that AI governance models are not designed to manage inappropriate behaviour of conversational AI tools, and are unable to do so. Another technical problem is that various outputs of a conversational AI tool are not reliable if they are sometimes appropriate and sometimes inappropriate, unless an AI governance model is trained to identify inappropriate interactions that require some intervention. A further technical problem is that an AI governance model is typically administered by one or more people, and is not implemented in software code in a way that can be automated.

According to one or more embodiments, the present disclosure provides a method/system to independently control and possibly block inappropriate interactions with a conversational AI tool. The method/system may sit outside of these conversational AI technologies.

According to one or more embodiments, the present disclosure may assist/resolve one or more the following challenges via an independently trained set of components. These challenges may be resolved by classifying inappropriate inputs by either a customer/employee, or a response from a one or more machine learning systems.

Disinformation: Large language models can be used to generate convincing fake news, propaganda, and disinformation, which can have harmful effects on society.

Privacy Violations: Large language models can be used to analyze and extract personal information from text data, which can violate user privacy.

Bias and Discrimination: Large language models can perpetuate biases and discrimination in society if they are trained on biased datasets or not properly audited for bias. This would negatively impact organizations, such as financial institutions.

Misuse of User Data: Large language models require large amounts of data to train, and if this data is obtained without user consent, it can be a violation of privacy. This problem could be related to data leakage may occur and a check to ensure privacy is not violated.

Legal and Ethical Implications: The use of large language models raises legal and ethical concerns, such as copyright infringement, intellectual property theft, and ownership of generated content. This is problem that needs to be resolved such that any input or output does not violate IP or infringe upon copyright.

Fraud: A user may interact with a large language model in a way that may provide a trigger to identifying potential fraud. This problem could be addressed by evaluating and looking for sentiment that may imply that someone is intending to commit fraud.

According to one or more embodiments, one or more of the following benefits may be provided: protect customers and employees from misbehaving conversational AI systems in real time; protects a brand from negative publicity, for example the brand of an organization implementing the conversational AI system; provides implementable model governance (model governance as code); allows an organization to respond to customer concerns in real-time; or positions an organization for more responsible AI interactions.

Figure 2:
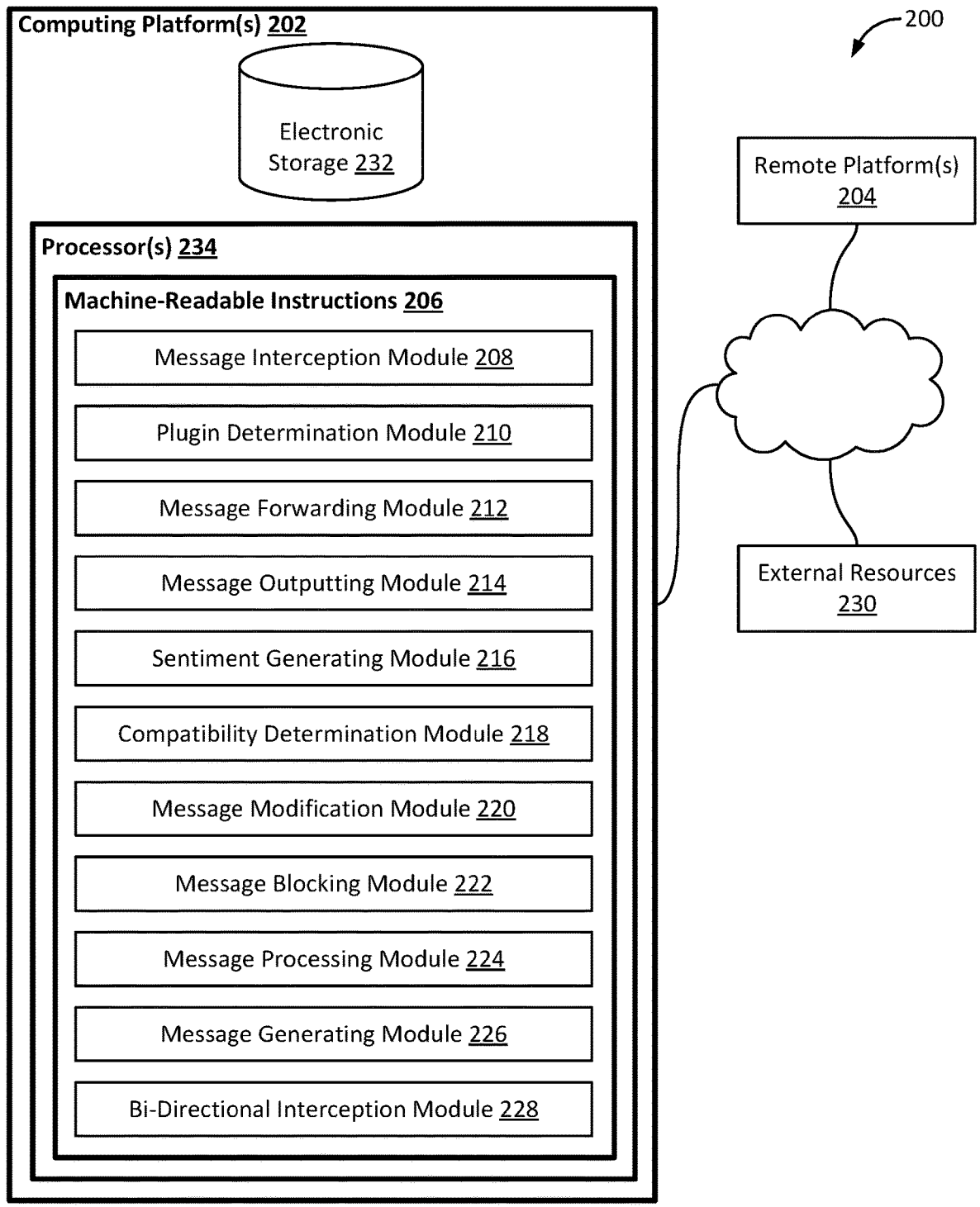
FIG. 2 illustrates another system configured for content management for a conversational artificial intelligence tool, in accordance with one or more embodiments.

FIG. 2 illustrates a system 200 configured for content management for a conversational artificial intelligence tool, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of message interception module 208, plugin determination module 210, message forwarding module 212, message outputting module 214, sentiment generating module 216, compatibility determination module 218, message modification module 220, message blocking module 222, message processing module 224, message generating module 226, bi-directional interception module 228, and/or other instruction modules.

Message interception module 208 may be configured to intercept, by an apparatus and from a data communication channel, a conversational AI message associated with the conversational AI tool. Message interception module 208 may comprise, or be in communication with, a plugin manager as described in relation to FIG. 1.

Message interception module 208 may be configured to intercept, by a pre-interceptor at the apparatus, the incoming conversational AI message between a user device and a computing device associated with a large language model of the conversational AI tool. Message interception module 208 may be configured to intercept, by a post-interceptor at the apparatus, the outgoing conversational AI message between a computing device associated with a large language model of the conversational AI tool and a user device.

Plugin determination module 210 may be configured to determine, for example by a plugin manager at the apparatus and based on stored policies, one or more plugins to receive the intercepted conversational AI message. The one or more plugins may be selected from a plurality of plugins associated with the plugin manager.

Message forwarding module 212 may be configured to selectively forward, at the apparatus, the conversational AI message to the one or more plugins for processing. Message forwarding module 212 may be configured to selectively forward, by the plugin manager at the apparatus, the modified conversational AI message to an intended recipient based on the processing at the one or more plugins. The intended recipient may be associated with an originator of the intercepted conversational AI message.

Message outputting module 214 may be configured to output, by the plugin manager at the apparatus, a modified conversational AI message based on the processing at the one or more plugins.

Sentiment generating module 216 may be configured to generate, by the apparatus and in association with one or more sentiment analysis engines associated with the one or more plugins, one or more sentiments associated with the conversational AI message. Sentiment generating module 216 may be configured to generate a plurality of sentiments at a plurality of sentiment analysis engines. Each of the plurality of sentiment analysis engines may be implemented at the one or more plugins.

Compatibility determination module 218 may be configured to determine, by the apparatus and based on the one or more generated sentiments, compatibility of the conversational AI message with an AI governance model. Compatibility determination module 218 may be configured to determine the compatibility of the conversational AI message with the AI governance model in relation to one or more of inappropriate content, disinformation, privacy violation, disinformation, or fraud detection.

Message modification module 220 may be configured to modify the conversational AI message when the conversational AI message is determined to be incompatible with the AI governance model.

Message blocking module 222 may be configured to block the conversational AI message when the conversational AI message is determined to be incompatible with the AI governance model.

Message processing module 224 may be configured to process, by the apparatus and at the one or more plugins, the conversational AI message.

Message generating module 226 may be configured to generate, by the apparatus and at the one or more plugins, the modified conversational AI message.

Bi-directional interception module 228 may be configured to intercept, by the apparatus, a plurality of conversational AI messages bi-directionally and in real-time, for example using a plugin manager at a pre-interceptor and at a post-interceptor, as shown in the embodiment of FIG. 1.

In some embodiments, computing platform(s) 202, remote platform(s) 204, and/or external resources 230 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 230 may be operatively linked via some other communication media.

A given remote platform 204 may include one or more processors configured to execute computer program modules. The computer program modules may be configured to enable an expert or user associated with the given remote platform 204 to interface with system 200 and/or external resources 230, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a web-centric laptop, a smartphone, a mobile computing device, a gaming console, and/or other computing platforms.

External resources 230 may include sources of information outside of system 200, external entities participating with system 200, and/or other resources. In some embodiments, some or all of the functionality attributed herein to external resources 230 may be provided by resources included in system 200.

Computing platform(s) 202 may include electronic storage 232, one or more processors 234, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 232 may comprise non-transitory storage media that electronically stores information. The electronic storage media of electronic storage 232 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 232 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 232 may include one or more virtual storage resources (e.g., cloud storage, a virtual private network, and/or other virtual storage resources). Electronic storage 232 may store software algorithms, information determined by processor(s) 234, information received from computing platform(s) 202, information received from remote platform(s) 204, and/or other information that enables computing platform(s) 202 to function as described herein.

Processor(s) 234 may be configured to provide information processing capabilities in computing platform(s) 202. As such, processor(s) 234 may include one or more of a digital processor, an analog processor, a digital circuit designed to process information, an analog circuit designed to process information, a state machine, and/or other mechanisms for electronically processing information. Although processor(s) 234 is shown in FIG. 2 as a single entity, this is for illustrative purposes only. In some embodiments, processor(s) 234 may include a plurality of processing units. These processing units may be physically located within the same device, or processor(s) 234 may represent processing functionality of a plurality of devices operating in coordination. Processor(s) 234 may be configured to execute modules 208, 210, 212, 214, 216, 218, 220, 222, 224, 226, and/or 228, and/or other modules. Processor(s) 234 may be configured to execute modules 208, 210, 212, 214, 216, 218, 220, 222, 224, 226, and/or 228, and/or other modules by software; hardware; firmware; some combination of software, hardware, and/or firmware; and/or other mechanisms for configuring processing capabilities on processor(s) 234. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, and/or 228 are illustrated in FIG. 2 as being implemented within a single processing unit, in embodiments in which processor(s) 234 includes multiple processing units, one or more of modules 208, 210, 212, 214, 216, 218, 220, 222, 224, 226, and/or 228 may be implemented remotely from the other modules. The description of the functionality provided by the different modules 208, 210, 212, 214, 216, 218, 220, 222, 224, 226, and/or 228 described below is for illustrative purposes, and is not intended to be limiting, as any of modules 208, 210, 212, 214, 216, 218, 220, 222, 224, 226, and/or 228 may provide more or less functionality than is described. For example, one or more of modules 208, 210, 212, 214, 216, 218, 220, 222, 224, 226, and/or 228 may be eliminated, and some or all of its functionality may be provided by other ones of modules 208, 210, 212, 214, 216, 218, 220, 222, 224, 226, and/or 228. As another example, processor(s) 234 may be configured to execute one or more additional modules that may perform some or all of the functionality attributed below to one of modules 208, 210, 212, 214, 216, 218, 220, 222, 224, 226, and/or 228.

Figure 3:
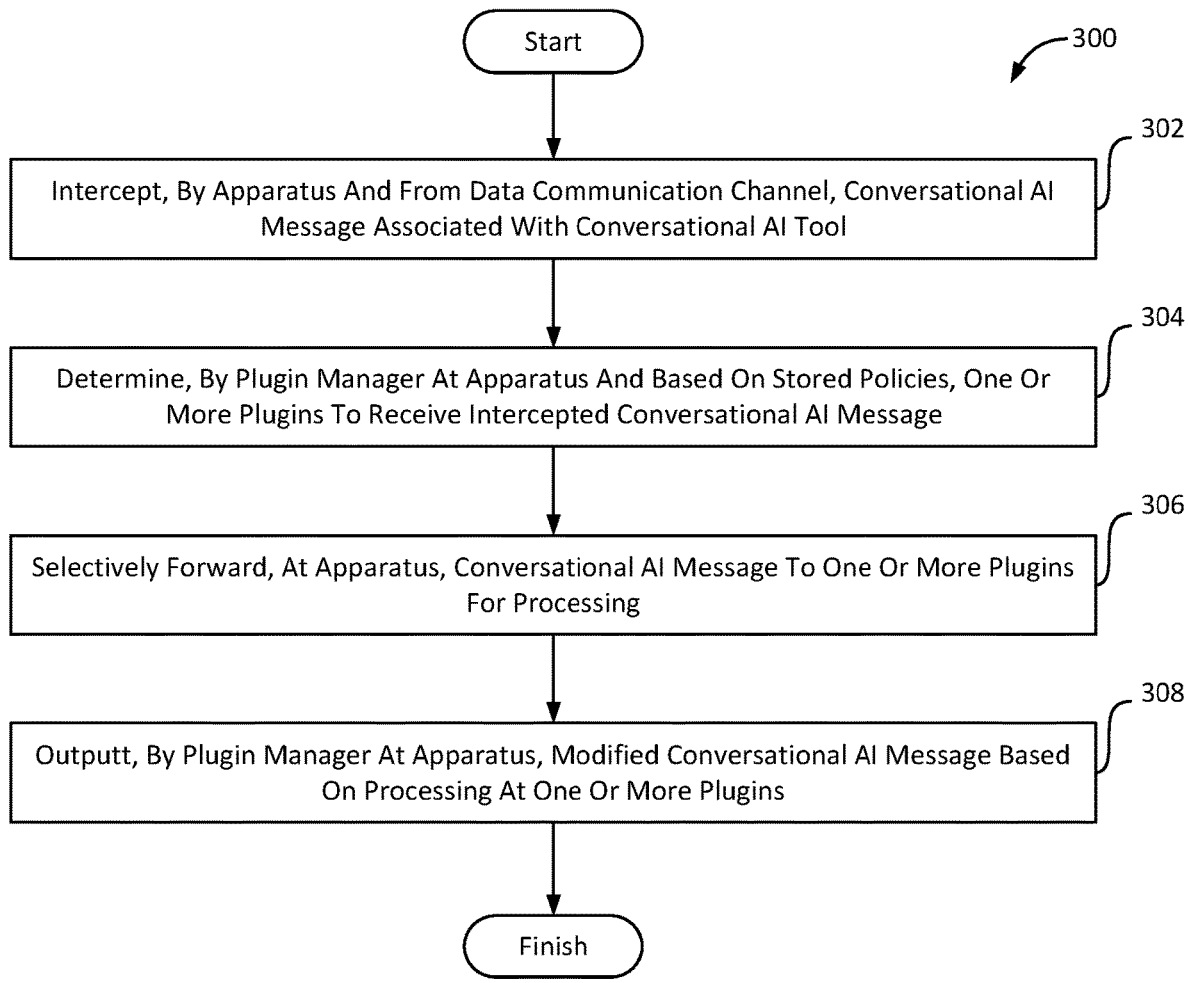
FIG. 3 illustrates a method for content management for a conversational artificial intelligence tool, in accordance with one or more embodiments.

FIG. 3 illustrates a method 300 for content management for a conversational artificial intelligence tool, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include intercepting, by an apparatus and from a data communication channel, a conversational AI message associated with the conversational AI tool. Operation 302 may be performed by one or more hardware processors configured by machine-readable instructions including a module that is the same as or similar to message interception module 208, in accordance with one or more embodiments.

An operation 304 may include determining, by a plugin manager at the apparatus and based on stored policies, one or more plugins to receive the intercepted conversational AI message. The one or more plugins may be selected from a plurality of plugins associated with the plugin manager. Operation 304 may be performed by one or more hardware processors configured by machine-readable instructions including a module that is the same as or similar to plugin determination module 210, in accordance with one or more embodiments.

An operation 306 may include selectively forwarding, at the apparatus, the conversational AI message to the one or more plugins for processing. Operation 306 may be performed by one or more hardware processors configured by machine-readable instructions including a module that is the same as or similar to message forwarding module 212, in accordance with one or more embodiments.

An operation 308 may include outputting, by the plugin manager at the apparatus, a modified conversational AI message based on the processing at the one or more plugins. Operation 308 may be performed by one or more hardware processors configured by machine-readable instructions including a module that is the same as or similar to message outputting module 214, in accordance with one or more embodiments.

Figure 4:
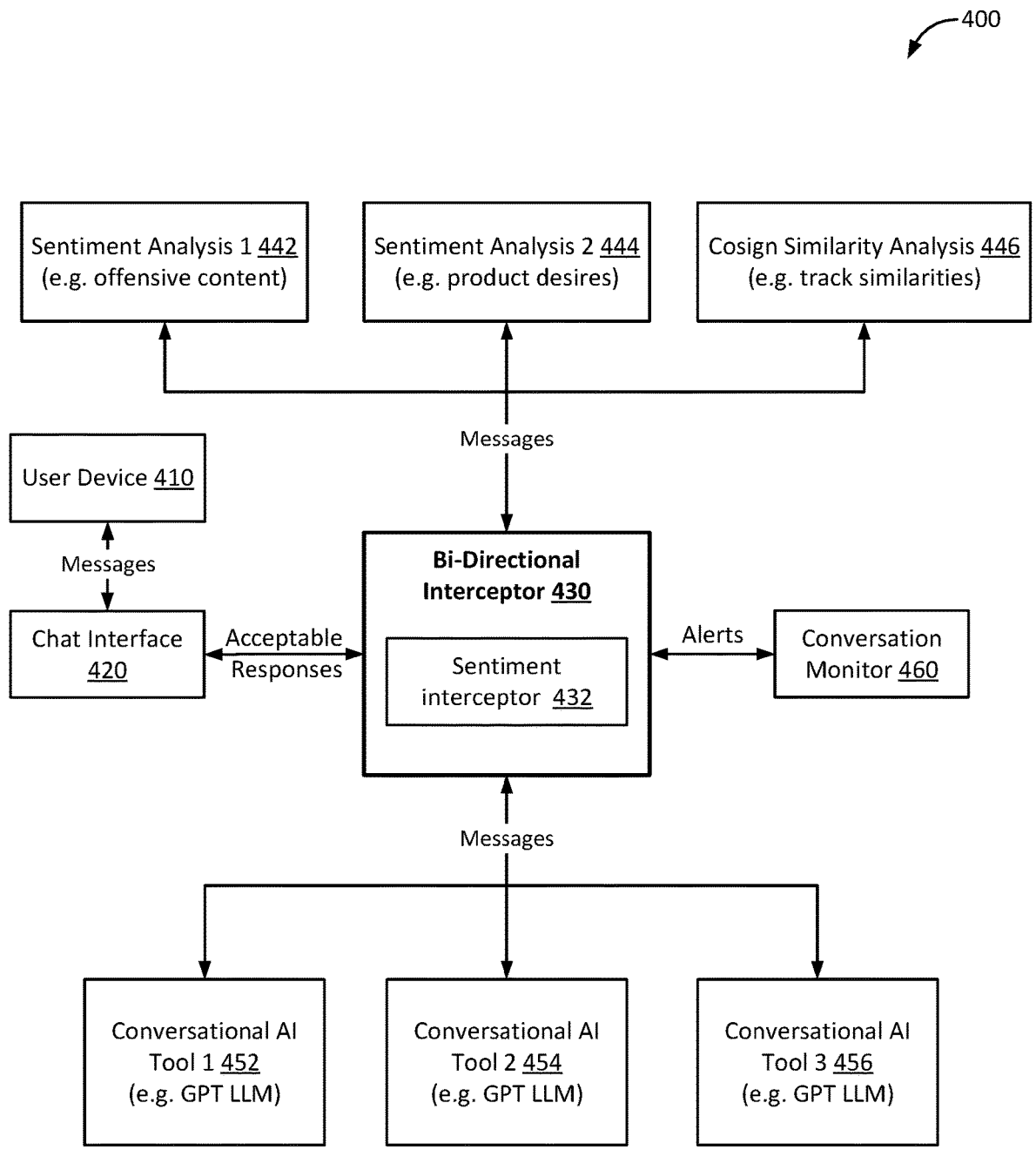
FIG. 4 illustrates a block and flow diagram associated with method for content management for a conversational artificial intelligence tool, in accordance with one or more embodiments.

FIG. 4 illustrates a block and flow diagram 400 associated with method for content management for a conversational artificial intelligence tool, in accordance with one or more embodiments.

According to one or more embodiments, the present disclosure provides an approach to intercept and limit inappropriate content in a real-time manner. A user device 410 may be in communication with a chat interface 420, which is itself in communication with a bi-directional interceptor 430. In an implementation, the bi-directional interceptor 430 may comprise or be implemented at a computing device. The bi-directional interceptor 430 may provide similar functionality to the pre-interceptor 150 and the post-interceptor 160 of the computing device 120 of FIG. 1. The bi-directional interceptor 430 may comprise a sentiment interceptor 432.

The solution may comprise one or more real-time trained sentiment analysis engines. For example, a first sentiment analysis engine 442 may be configured to analyze sentiment with respect to offensive content. A second sentiment analysis engine 444 may be configured to analyze sentiment with respect to product desires. A consign similarity analysis engine 446 may be configured to track similarities between a current conversational AI message and other conversational AI messages. These engines may act as interceptors interceding, examining, and possibly blocking inbound and outbound responses. This solution may alert an organization implementing the conversational AI tool, in real-time fashion, of potentially damaging content, whether this originates from the poorly trained bots or inbound input messages from bad actors who are attempting to mis-train models. The interceptors may also act as intermediaries to determine if data leakage is occurring of PCI (Payment Card Industry) sensitive content and act as also as obfuscation mechanisms. This solution may be implemented as a network of cooperating sentiment analysis engines that are chained to together to evaluate these interactions end to end.

The bi-directional interceptor 430 may be configured to: generate, in association with one or more sentiment analysis engines associated with one or more plugins, one or more sentiments associated with the conversational AI message; determine, by the computing device and based on the one or more generated sentiments, compatibility of the conversational AI message with an AI governance model; and modify the conversational AI message when the conversational AI message is determined to be incompatible with the AI governance model.

In an example embodiment, the bi-directional interceptor 430 may be configured to generate a plurality of sentiments at a plurality of sentiment analysis engines, wherein each of the plurality of sentiment analysis engines is implemented at one or more plugins. In an example embodiment, the computing device 420 may be configured to determine the compatibility of the conversational AI message with the AI governance model in relation to one or more of: inappropriate content, disinformation, privacy violation, disinformation, or fraud detection.

Some implementation details may include: to and from messages are stored in various states and they can be represented as a series of work tokens; context is stored; inappropriate messages in original form are stored and reported out; model's misbehaving is reported to employees for re-training of the models to ensure bias is removed protecting the organization's brand.

Customer and/or employee training models may interact with one or more models via a chat-based UI, voice, or a combination of means across a variety of different channels As messages arrive, the bi-directional interceptor 430 may determine which interceptors need to evaluate the message. This may include a plugin manager as previously described. These messages may be sent asynchronously and/or synchronously to various interceptors. Those interceptors will perform analysis of messages to determine inappropriate, undesirable or unacceptable content. The bi-directional interceptor 430 may be in communication with a plurality of conversational AI tools 452, 454, 456, such that a central bi-directional interceptor 430 may provide functionality for the plurality of conversational AI tools. In another implementation, a bi-directional interceptor may be configured to interact one-on-one with a single conversational AI tool, and may be configured or optimized to best interact with that single conversational AI tool.

In an embodiment, each interceptor may comprise a plugin-based interface that can be added at run-time with the need to recompile/change the bi-directional sentiment component of FIG. 4. It can be discovered through a registry mechanism or a configuration file/data store, which may be implemented as a database, configuration file, API etc.

Each sentiment analysis may apply filtering rules and evaluate the sentence structure via tokenization and perform various similarity analysis on the sentence structure. This may be a combination of similarity algorithms such as cosine similarity, Euclidean distance analysis etc. For each sentiment analysis component, it will have remembered the previous sentence and be able to evaluate that in context to get a clear picture of the interaction.

Each sentiment analysis component may evaluate what is occurring and vote on whether to allow this message to continue to the designated model. This could be a ChatGPT model, a Google DialogFlow model etc.

When each model responds, the sentiment analysis components may be invoked again to ensure that a message being returned to the customer is not offensive, or has not leaked important data, for example as per an organization's Data Leak Protection policies. The sentiment analysis components may vote again on whether to reply to the user and/or modify the message and return a more appropriate message to return.

An alert may be sent asynchronously or synchronously, alerting someone at the organization of the conversation. This may comprise a list of insights about the customer or alert the organization of a potentially harmful response being sent to and/or received from the customer. A final decision may be made to reply to the customer in real-time. As shown in the example embodiment of FIG. 5, alerts may be transmitted between the bi-directional interceptor 430 and a conversation monitor 460.

Within each of the sentiment analysis components mentioned above the following may typically occur:

Potentially inappropriate Input Text. The customer/employee inputs text or the model responds with text Tokenizer. The tokenizer will extract the text and break it apart into individual tokens/words that can be processed by the model. The tokens may have inappropriate words that can be acted upon and rejected. Before moving on to the Attention Mechanism message can be sent and this component can choose to reject input text.

Encoder: The encoder is responsible for processing the input tokens and generating a representation of the input in a high-dimensional vector space. This vector representation is then passed on to the decoder.

Attention Mechanism. The attention mechanism will assign weights focusing on inappropriate content which would normally have greater weighting.

Generated Action. This a policy action to take if it has been determined from previous steps that the customer or the ML models generated an inappropriate response.

Fine-tuning Data: The fine-tuning data is a smaller corpus of text that is used to fine-tune the pre-trained model for specific tasks. In this step this solution would train the sentiment analysis regarding inappropriate content, for example, remarks that are homophobic, misogynistic and/or racists. Fine-tuning helps the model to adapt to the specific language and terminology used in the biased target domain.

In an implementation, a separate sentiment analysis engine may be used for each of a plurality of types of inappropriate or undesired types of content or interaction. In such an implementation, separate fine tuning data may be provided for each separate sentiment analysis engine.

Figure 5:
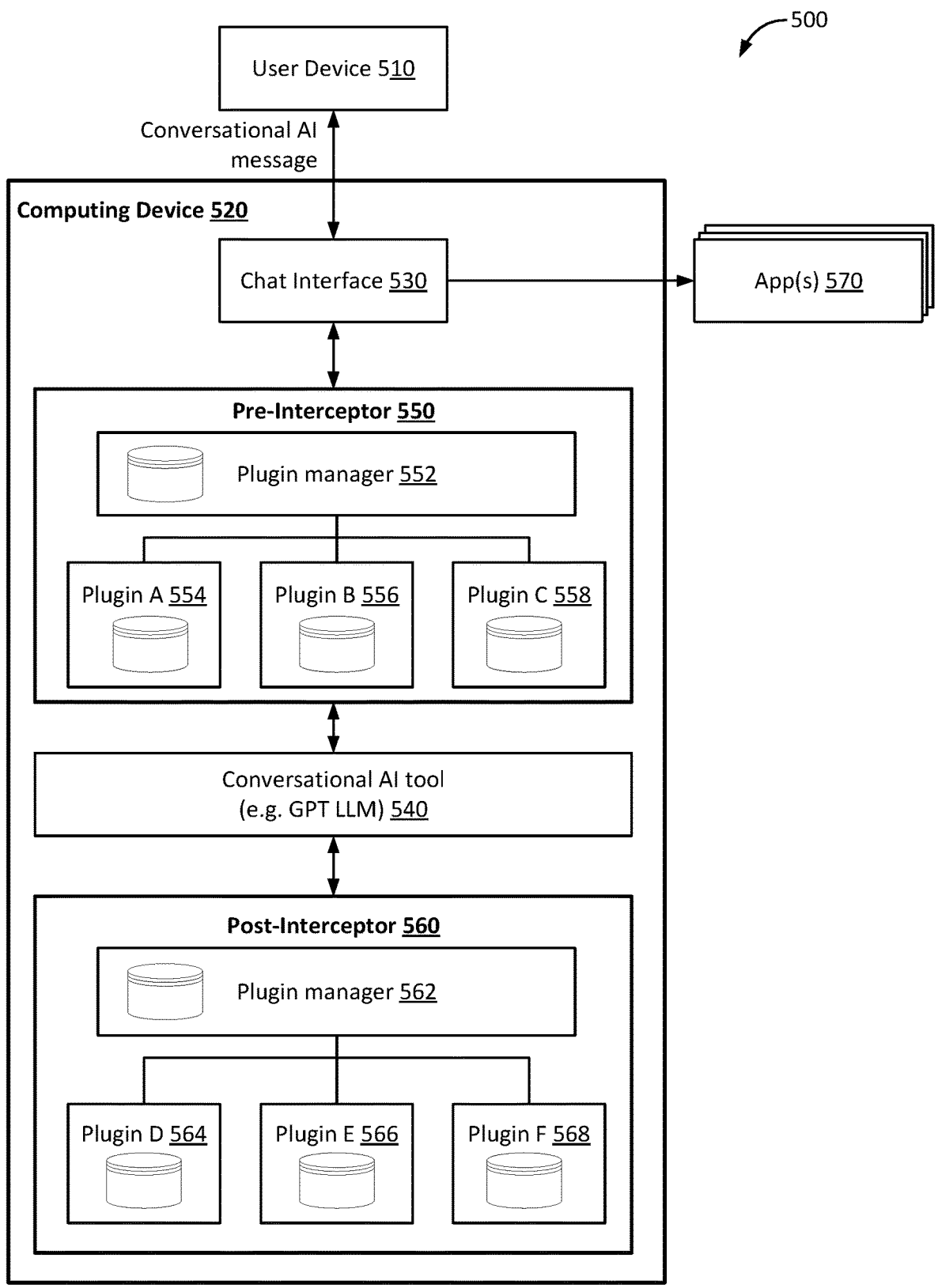
FIG. 5 illustrates a block and flow diagram associated with another method for content management for a conversational artificial intelligence tool, in accordance with one or more embodiments.

FIG. 5 illustrates a block and flow diagram 500 associated with another method for content management for a conversational artificial intelligence tool, in accordance with one or more embodiments. The embodiment of FIG. 5 comprises two plugin managers, for example at a pre-interceptor and a post-interceptor, similar to the embodiment of FIG. 1. Details provided with respect to elements in FIG. 1 apply to the similar elements in FIG. 5, but are not repeated herein for the sake of brevity.

A user device 510 may be in communication with a computing device 520, for example via a chat interface 530. A conversational AI tool 540, such as a GPT LLM, may be implemented at the computing device 520 associated with the organization.

A pre-interceptor 550 is configured to intercept an incoming conversational AI message between the user device 510 and the computing device 520 associated with an LLM 540 of the conversational AI tool. The pre-interceptor 550 comprises a first plugin manager 552 configured to determine based on stored policies which of the pre-interceptor plugin A 554, plugin B 556 and/or plugin C 558 are to receive the intercepted conversational AI message. A post-interceptor 560 configured to intercept an outgoing conversational AI message between the computing device 520 associated with the LLM 540 and the user device 510. The post-interceptor 560 comprises a second plugin manager 562 configured to determine based on stored policies which of the post-interceptor plugin D 564, plugin E 566 and/or plugin E 568 are to receive the intercepted conversational AI message.

In the embodiment FIG. 5, the illustrated databases associated with the plugins may be configured to perform additional features. In an example embodiment, one or more of the illustrated databases comprise other LLMs. In an example embodiment, one or more of the illustrated databases perform sentiment analysis. In an example embodiment, one or more of the illustrated databases are configured to determine if a given message contains confidential information or derogatory comments, or simply needs to be logged. One or more of the plugins may log messages in its own data store, such as in the illustrated database. The databases may be previously created vector databases of customer transactions, data internal to the organization and/or data external to the organization, for example from third parties.

The present disclosure provides one or more embodiments of a system and method to automatically moderate content sent to and from conversational AI solutions such as ChatGPT, to ensure responsible content and flag undesirable intentions. According to one or more embodiments, bi-directional content moderation is provided to deliver responsible AI interactions and automate model governance.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out in the dependent clauses:

One aspect of the present disclosure relates to a system configured for content management for a conversational artificial intelligence tool. The system may include one or more hardware processors configured by machine-readable instructions. The processor(s) may be configured to intercept, by an apparatus and from a data communication channel, a conversational AI message associated with the conversational AI tool. The processor(s) may be configured to determine, by a plugin manager at the apparatus and based on stored policies, one or more plugins to receive the intercepted conversational AI message. The one or more plugins may be selected from a plurality of plugins associated with the plugin manager. The processor(s) may be configured to selectively forward, at the apparatus, the conversational AI message to the one or more plugins for processing. The processor(s) may be configured to output, by the plugin manager at the apparatus, a modified conversational AI message based on the processing at the one or more plugins.

In some implementations of the system, the processor(s) may be configured to intercept, by a pre-interceptor at the apparatus, the incoming conversational AI message between a user device and a computing device associated with a large language model of the conversational AI tool.

In some implementations of the system, the processor(s) may be configured to intercept, by a post-interceptor at the apparatus, the outgoing conversational AI message between a computing device associated with a large language model of the conversational AI tool and a user device.

In some implementations of the system, the processor(s) may be configured to generate, by the apparatus and in association with one or more sentiment analysis engines associated with the one or more plugins, one or more sentiments associated with the conversational AI message. In some implementations of the system, the processor(s) may be configured to determine, by the apparatus and based on the one or more generated sentiments, compatibility of the conversational AI message with an AI governance model. In some implementations of the system, the processor(s) may be configured to modify the conversational AI message when the conversational AI message is determined to be incompatible with the AI governance model.

In some implementations of the system, the processor(s) may be configured to generate a plurality of sentiments at a plurality of sentiment analysis engines. In some implementations of the system, each of the plurality of sentiment analysis engines may be implemented at the one or more plugins.

In some implementations of the system, the processor(s) may be configured to determine the compatibility of the conversational AI message with the AI governance model in relation to one or more of inappropriate content, disinformation, privacy violation, disinformation, or fraud detection.

In some implementations of the system, the processor(s) may be configured to block the conversational AI message when the conversational AI message is determined to be incompatible with the AI governance model.

In some implementations of the system, the processor(s) may be configured to process, by the apparatus and at the one or more plugins, the conversational AI message. In some implementations of the system, the processor(s) may be configured to generate, by the apparatus and at the one or more plugins, the modified conversational AI message.

In some implementations of the system, the processor(s) may be configured to selectively forward, by the plugin manager at the apparatus, the modified conversational AI message to an intended recipient based on the processing at the one or more plugins.

In some implementations of the system, the intended recipient may be associated with an originator of the intercepted conversational AI message.

In some implementations of the system, the processor(s) may be configured to intercept, by the apparatus, a plurality of conversational AI messages bi-directionally and in real-time.

Another aspect of the present disclosure relates to a method for content management for a conversational artificial intelligence tool. The method may include intercepting, by an apparatus and from a data communication channel, a conversational AI message associated with the conversational AI tool. The method may include determining, by a plugin manager at the apparatus and based on stored policies, one or more plugins to receive the intercepted conversational AI message. The one or more plugins may be selected from a plurality of plugins associated with the plugin manager. The method may include selectively forwarding, at the apparatus, the conversational AI message to the one or more plugins for processing. The method may include outputting, by the plugin manager at the apparatus, a modified conversational AI message based on the processing at the one or more plugins.

In some implementations of the method, it may include intercepting, by a pre-interceptor at the apparatus, the incoming conversational AI message between a user device and a computing device associated with a large language model of the conversational AI tool.

In some implementations of the method, it may include intercepting, by a post-interceptor at the apparatus, the outgoing conversational AI message between a computing device associated with a large language model of the conversational AI tool and a user device.

In some implementations of the method, it may include generating, by the apparatus and in association with one or more sentiment analysis engines associated with the one or more plugins, one or more sentiments associated with the conversational AI message. In some implementations of the method, it may include determining, by the apparatus and based on the one or more generated sentiments, compatibility of the conversational AI message with an AI governance model. In some implementations of the method, it may include modifying the conversational AI message when the conversational AI message is determined to be incompatible with the AI governance model.

In some implementations of the method, it may include generating a plurality of sentiments at a plurality of sentiment analysis engines. In some implementations of the method, each of the plurality of sentiment analysis engines may be implemented at the one or more plugins.

In some implementations of the method, it may include determining the compatibility of the conversational AI message with the AI governance model in relation to one or more of inappropriate content, disinformation, privacy violation, disinformation, or fraud detection.

In some implementations of the method, it may include blocking the conversational AI message when the conversational AI message is determined to be incompatible with the AI governance model.

In some implementations of the method, it may include processing, by the apparatus and at the one or more plugins, the conversational AI message. In some implementations of the method, it may include generating, by the apparatus and at the one or more plugins, the modified conversational AI message.

In some implementations of the method, it may include selectively forwarding, by the plugin manager at the apparatus, the modified conversational AI message to an intended recipient based on the processing at the one or more plugins.

In some implementations of the method, the intended recipient may be associated with an originator of the intercepted conversational AI message.

In some implementations of the method, it may include intercepting, by the apparatus, a plurality of conversational AI messages bi-directionally and in real-time.

Yet another aspect of the present disclosure relates to a non-transient computer-readable storage medium having instructions embodied thereon, the instructions being executable by one or more processors to perform a method for content management for a conversational artificial intelligence tool. The method may include intercepting, by an apparatus and from a data communication channel, a conversational AI message associated with the conversational AI tool. The method may include determining, by a plugin manager at the apparatus and based on stored policies, one or more plugins to receive the intercepted conversational AI message. The one or more plugins may be selected from a plurality of plugins associated with the plugin manager. The method may include selectively forwarding, at the apparatus, the conversational AI message to the one or more plugins for processing. The method may include outputting, by the plugin manager at the apparatus, a modified conversational AI message based on the processing at the one or more plugins.

In some implementations of the computer-readable storage medium, the method may include intercepting, by a pre-interceptor at the apparatus, the incoming conversational AI message between a user device and a computing device associated with a large language model of the conversational AI tool.

In some implementations of the computer-readable storage medium, the method may include intercepting, by a post-interceptor at the apparatus, the outgoing conversational AI message between a computing device associated with a large language model of the conversational AI tool and a user device.

In some implementations of the computer-readable storage medium, the method may include generating, by the apparatus and in association with one or more sentiment analysis engines associated with the one or more plugins, one or more sentiments associated with the conversational AI message. In some implementations of the computer-readable storage medium, the method may include determining, by the apparatus and based on the one or more generated sentiments, compatibility of the conversational AI message with an AI governance model. In some implementations of the computer-readable storage medium, the method may include modifying the conversational AI message when the conversational AI message is determined to be incompatible with the AI governance model.

In some implementations of the computer-readable storage medium, the method may include generating a plurality of sentiments at a plurality of sentiment analysis engines. In some implementations of the computer-readable storage medium, each of the plurality of sentiment analysis engines may be implemented at the one or more plugins.

In some implementations of the computer-readable storage medium, the method may include determining the compatibility of the conversational AI message with the AI governance model in relation to one or more of inappropriate content, disinformation, privacy violation, disinformation, or fraud detection.

In some implementations of the computer-readable storage medium, the method may include blocking the conversational AI message when the conversational AI message is determined to be incompatible with the AI governance model.

In some implementations of the computer-readable storage medium, the method may include processing, by the apparatus and at the one or more plugins, the conversational AI message. In some implementations of the computer-readable storage medium, the method may include generating, by the apparatus and at the one or more plugins, the modified conversational AI message.

In some implementations of the computer-readable storage medium, the method may include selectively forwarding, by the plugin manager at the apparatus, the modified conversational AI message to an intended recipient based on the processing at the one or more plugins.

In some implementations of the computer-readable storage medium, the intended recipient may be associated with an originator of the intercepted conversational AI message.

In some implementations of the computer-readable storage medium, the method may include intercepting, by the apparatus, a plurality of conversational AI messages bi-directionally and in real-time.

Still another aspect of the present disclosure relates to a system configured for content management for a conversational artificial intelligence tool. The system may include means for intercepting, by an apparatus and from a data communication channel, a conversational AI message associated with the conversational AI tool. The system may include means for determining, by a plugin manager at the apparatus and based on stored policies, one or more plugins to receive the intercepted conversational AI message. The one or more plugins may be selected from a plurality of plugins associated with the plugin manager. The system may include means for selectively forwarding, at the apparatus, the conversational AI message to the one or more plugins for processing. The system may include means for outputting, by the plugin manager at the apparatus, a modified conversational AI message based on the processing at the one or more plugins.

In some implementations of the system, the system may include means for intercepting, by a pre-interceptor at the apparatus, the incoming conversational AI message between a user device and a computing device associated with a large language model of the conversational AI tool.

In some implementations of the system, the system may include means for intercepting, by a post-interceptor at the apparatus, the outgoing conversational AI message between a computing device associated with a large language model of the conversational AI tool and a user device.

In some implementations of the system, the system may include means for generating, by the apparatus and in association with one or more sentiment analysis engines associated with the one or more plugins, one or more sentiments associated with the conversational AI message. In some implementations of the system, the system may include means for determining, by the apparatus and based on the one or more generated sentiments, compatibility of the conversational AI message with an AI governance model. In some implementations of the system, the system may include means for modifying the conversational AI message when the conversational AI message is determined to be incompatible with the AI governance model.

In some implementations of the system, the system may include means for generating a plurality of sentiments at a plurality of sentiment analysis engines. In some implementations of the system, each of the plurality of sentiment analysis engines may be implemented at the one or more plugins.

In some implementations of the system, the system may include means for determining the compatibility of the conversational AI message with the AI governance model in relation to one or more of inappropriate content, disinformation, privacy violation, disinformation, or fraud detection.

In some implementations of the system, the system may include means for blocking the conversational AI message when the conversational AI message is determined to be incompatible with the AI governance model.

In some implementations of the system, the system may include means for processing, by the apparatus and at the one or more plugins, the conversational AI message. In some implementations of the system, the system may include means for generating, by the apparatus and at the one or more plugins, the modified conversational AI message.

In some implementations of the system, the system may include means for selectively forwarding, by the plugin manager at the apparatus, the modified conversational AI message to an intended recipient based on the processing at the one or more plugins.

In some implementations of the system, the intended recipient may be associated with an originator of the intercepted conversational AI message.

In some implementations of the system, the system may include means for intercepting, by the apparatus, a plurality of conversational AI messages bi-directionally and in real-time.

Even another aspect of the present disclosure relates to a computing platform configured for content management for a conversational artificial intelligence tool. The computing platform may include a non-transient computer-readable storage medium having executable instructions embodied thereon. The computing platform may include one or more hardware processors configured to execute the instructions. The processor(s) may execute the instructions to intercept, by an apparatus and from a data communication channel, a conversational AI message associated with the conversational AI tool. The processor(s) may execute the instructions to determine, by a plugin manager at the apparatus and based on stored policies, one or more plugins to receive the intercepted conversational AI message. The one or more plugins may be selected from a plurality of plugins associated with the plugin manager. The processor(s) may execute the instructions to selectively forward, at the apparatus, the conversational AI message to the one or more plugins for processing. The processor(s) may execute the instructions to output, by the plugin manager at the apparatus, a modified conversational AI message based on the processing at the one or more plugins.

In some implementations of the computing platform, the processor(s) may execute the instructions to intercept, by a pre-interceptor at the apparatus, the incoming conversational AI message between a user device and a computing device associated with a large language model of the conversational AI tool.

In some implementations of the computing platform, the processor(s) may execute the instructions to intercept, by a post-interceptor at the apparatus, the outgoing conversational AI message between a computing device associated with a large language model of the conversational AI tool and a user device.

In some implementations of the computing platform, the processor(s) may execute the instructions to generate, by the apparatus and in association with one or more sentiment analysis engines associated with the one or more plugins, one or more sentiments associated with the conversational AI message. In some implementations of the computing platform, the processor(s) may execute the instructions to determine, by the apparatus and based on the one or more generated sentiments, compatibility of the conversational AI message with an AI governance model. In some implementations of the computing platform, the processor(s) may execute the instructions to modify the conversational AI message when the conversational AI message is determined to be incompatible with the AI governance model.

In some implementations of the computing platform, the processor(s) may execute the instructions to generate a plurality of sentiments at a plurality of sentiment analysis engines. In some implementations of the computing platform, each of the plurality of sentiment analysis engines may be implemented at the one or more plugins.

In some implementations of the computing platform, the processor(s) may execute the instructions to determine the compatibility of the conversational AI message with the AI governance model in relation to one or more of inappropriate content, disinformation, privacy violation, disinformation, or fraud detection.

In some implementations of the computing platform, the processor(s) may execute the instructions to block the conversational AI message when the conversational AI message is determined to be incompatible with the AI governance model.

In some implementations of the computing platform, the processor(s) may execute the instructions to process, by the apparatus and at the one or more plugins, the conversational AI message. In some implementations of the computing platform, the processor(s) may execute the instructions to generate, by the apparatus and at the one or more plugins, the modified conversational AI message.

In some implementations of the computing platform, the processor(s) may execute the instructions to selectively forward, by the plugin manager at the apparatus, the modified conversational AI message to an intended recipient based on the processing at the one or more plugins. In some implementations of the computing platform, the intended recipient may be associated with an originator of the intercepted conversational AI message.

In some implementations of the computing platform, the processor(s) may execute the instructions to intercept, by the apparatus, a plurality of conversational AI messages bi-directionally and in real-time.

What is claimed is:

1. An apparatus configured for content management in a conversational artificial intelligence (AI) tool, the apparatus comprising:
a non-transient computer-readable storage medium having executable instructions embodied thereon; and
one or more hardware processors configured to execute the instructions to:
intercept, by the apparatus and from a data communication channel, a conversational AI message being forwarded to or being received from a large language model of the conversational AI tool;
determine, by a plugin manager at the apparatus and based on stored policies, one or more plugins to receive the intercepted conversational AI message, the one or more plugins selected from a plurality of plugins associated with the plugin manager, the plurality of plugins being external to the large language model;
selectively forward, at the apparatus, the conversational AI message to the one or more plugins for processing;
generate, by the apparatus and in association with one or more sentiment analysis engines associated with the one or more plugins, one or more sentiments based on the conversational AI message and a previous conversational AI message, the one or more sentiments being associated with the conversational AI message; and
output, by the plugin manager at the apparatus, a modified conversational AI message based on the one or more sentiments.

2. The apparatus of claim 1 wherein the one or more hardware processors are further configured to execute the instructions to:
intercept, by a pre-interceptor at the apparatus, the incoming conversational AI message between a user device and a computing device associated with the large language model of the conversational AI tool; and
intercept, by a post-interceptor at the apparatus, the outgoing conversational AI message between a computing device associated with the large language model of the conversational AI tool and a user device.

3. The apparatus of claim 1 wherein the one or more hardware processors are further configured to execute the instructions to:
generate the one or more sentiments associated with the conversational AI message with the one or more sentiment analysis engines and a similarity analysis engine.

4. The apparatus of claim 1 wherein the one or more hardware processors are further configured to execute the instructions to:
determine, by the apparatus and based on the one or more generated sentiments, compatibility of the conversational AI message with an AI governance model; and
modify the conversational AI message when the conversational AI message is determined to be incompatible with the AI governance model.

5. The apparatus of claim 4 wherein the one or more hardware processors are further configured to execute the instructions to:
generate a plurality of sentiments at a plurality of sentiment analysis engines, wherein each of the plurality of sentiment analysis engines is implemented at the one or more plugins.

6. The apparatus of claim 4 wherein the one or more hardware processors are further configured to execute the instructions to:
determine the compatibility of the conversational AI message with the AI governance model in relation to one or more of: privacy violation and fraud detection.

7. The apparatus of claim 4 wherein the one or more hardware processors are further configured to execute the instructions to:
block the conversational AI message when the conversational AI message is determined to be incompatible with the AI governance model.

8. The apparatus of claim 1 wherein the one or more hardware processors are further configured to execute the instructions to:
process, by the apparatus and at the one or more plugins, the conversational AI message; and
generate, by the apparatus and at the one or more plugins, the modified conversational AI message.

9. The apparatus of claim 1 wherein the one or more hardware processors are further configured to execute the instructions to:
intercept, by the apparatus, a plurality of conversational AI messages bi-directionally and in real-time.

10. A method of content management for a conversational artificial intelligence (AI) tool, the method comprising:
intercepting, by an apparatus and from a data communication channel, a conversational AI message being forwarded to or being received from a large language model of the conversational AI tool;
determining, by a plugin manager at the apparatus and based on stored policies, one or more plugins to receive the intercepted conversational AI message, the one or more plugins selected from a plurality of plugins associated with the plugin manager, the plurality of plugins being external to the large language model;
selectively forwarding, at the apparatus, the conversational AI message to the one or more plugins for processing;
generating, by the apparatus with one or more sentiment analysis engines associated with the one or more plugins, one or more sentiments based on the conversational AI message and a previous conversational AI message; and
outputting, by the plugin manager at the apparatus, a modified conversational AI message based on the one or more sentiments associated with the conversational AI message.

11. The method of claim 10 further comprising:
intercepting, by a pre-interceptor at the apparatus, the incoming conversational AI message between a user device and a computing device associated with the large language model of the conversational AI tool; or intercepting, by a post-interceptor at the apparatus, the outgoing conversational AI message between a computing device associated with the large language model of the conversational AI tool and a user device.

12. The method of claim 11 further comprising:
generating the one or more sentiments with the one or more sentiment analysis engines and a similarity analysis engine.

13. The method of claim 12 further comprising:
determining, by the apparatus and based on the one or more generated sentiments, compatibility of the conversational AI message with an AI governance model; and
blocking or modifying the conversational AI message when the conversational AI message is determined to be incompatible with the AI governance model.

14. The method of claim 13 further comprising:
generating a plurality of sentiments at a plurality of sentiment analysis engines, wherein each of the plurality of sentiment analysis engines is implemented at the one or more plugins.

15. The method of claim 13 further comprising:
determining the compatibility of the conversational AI message with the AI governance model in relation to one or more of: privacy violation and fraud detection.

16. The method of claim 13 further comprising:
blocking the conversational AI message when the conversational AI message is determined to be incompatible with the AI governance model.

17. The method of claim 10 further comprising:
processing, by the apparatus and at the one or more plugins, the conversational AI message; and
generating, by the apparatus and at the one or more plugins, the modified conversational AI message.

18. The method of claim 10 further comprising:
intercepting, by the apparatus, a plurality of conversational AI messages bi-directionally and in real-time.

19. A non-transient computer-readable storage medium having instructions embodied thereon, the instructions being executable by one or more processors to perform a method of content management for a conversational artificial intelligence (AI) tool, the method comprising:
intercepting, by an apparatus and from a data communication channel, a conversational AI message being forwarded to or being received from a large language model of the conversational AI tool;
determining, by a plugin manager at the apparatus and based on stored policies, one or more plugins to receive the intercepted conversational AI message, the one or more plugins selected from a plurality of plugins associated with the plugin manager, the plurality of plugins being external to, and interacting with, the large language model;
selectively forwarding, at the apparatus, the conversational AI message to the one or more plugins for processing;
generate, by the apparatus and in association with one or more sentiment analysis engines associated with the one or more plugins, one or more sentiments based on the conversational AI message and a previous conversational AI message; and
outputting, by the plugin manager at the apparatus, a modified conversational AI message based on the one or more sentiments associated with the conversational AI message.

20. The non-transient computer-readable storage medium of claim 19 wherein the method further comprises:
generating the one or more sentiments associated with the conversational AI message with the one or more sentiment analysis engines and a similarity analysis engine;
determining, by the apparatus and based on the one or more generated sentiments, compatibility of the conversational AI message with an AI governance model; and
blocking or modifying the conversational AI message when the conversational AI message is determined to be incompatible with the AI governance model.

* * * * *